(No Model.) 5 Sheets—Sheet 1.

W. A. LORENZ & W. H. HONISS.
PAPER BAG MACHINE.

No. 337,965. Patented Mar. 16, 1886.

Witnesses
Edward E. Claussen
Henry T. Brück

Inventors
William A. Lorenz
William H. Honiss (No Model.)  5 Sheets—Sheet 2.

W. A. LORENZ & W. H. HONISS.
PAPER BAG MACHINE.

No. 337,965. Patented Mar. 16, 1886.

Witnesses
Edward E. Claussen
Henry J. Brück

Inventors
William A. Lorenz
William H. Honiss (No Model.) 5 Sheets—Sheet 3.

W. A. LORENZ & W. H. HONISS.
PAPER BAG MACHINE.

No. 337,965. Patented Mar. 16, 1886.

Witnesses
Edward E. Claussens
Henry T. Brück

Inventors
William A. Lorenz
William H. Honiss

N. PETERS, Photo-Lithographer, Washington, D. C.

(No Model.) 5 Sheets—Sheet 4.

W. A. LORENZ & W. H. HONISS.
PAPER BAG MACHINE.

No. 337,965. Patented Mar. 16, 1886.

Witnesses
Edward E. Claussen
Henry T. Brück

Inventors
William A. Lorenz
William H. Honiss (No Model.) 5 Sheets—Sheet 5.
W. A. LORENZ & W. H. HONISS.
PAPER BAG MACHINE.
No. 337,965. Patented Mar. 16, 1886.
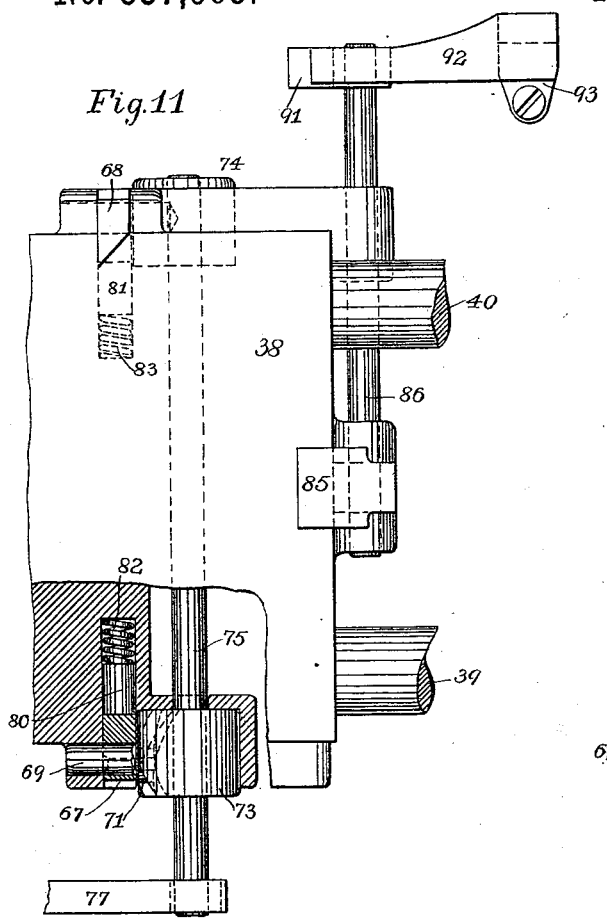
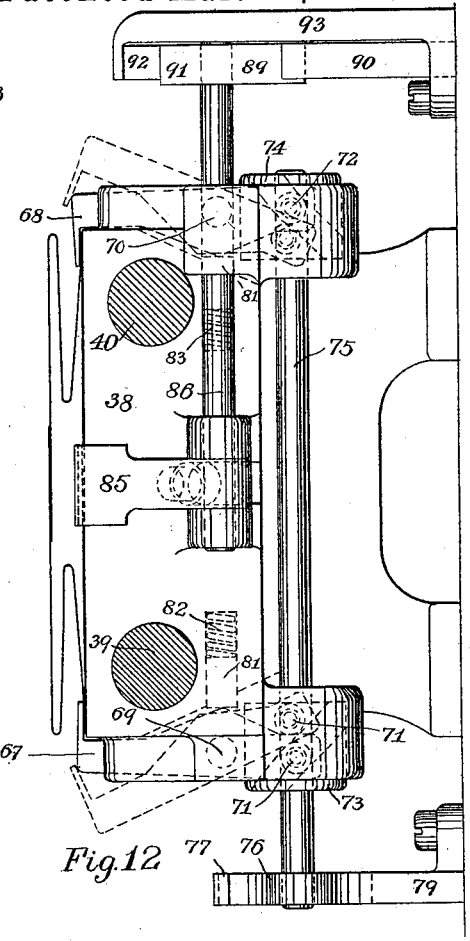
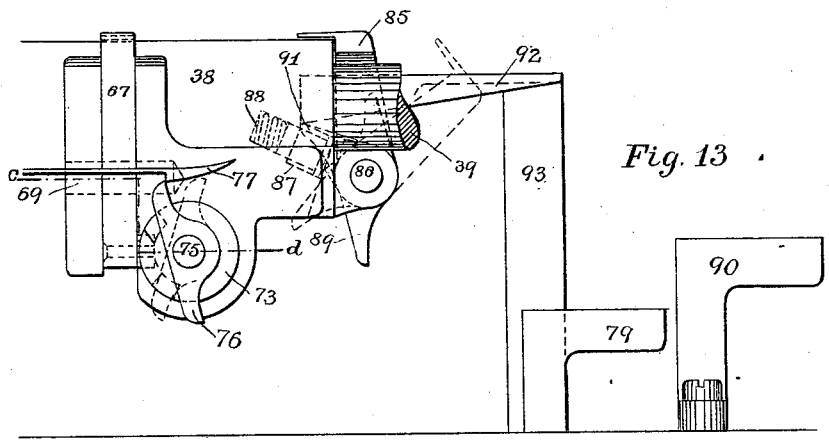
Witnesses.
Edward E. Clausen
Henry T. Brick
Inventors.
William A. Lorenz
William H. Honiss

UNITED STATES PATENT OFFICE.

WILLIAM A. LORENZ AND WILLIAM H. HONISS, OF HARTFORD, CONNECTICUT, ASSIGNORS TO FELIX W. LEINBACH AND CLARENCE A. WOLLE, OF BETHLEHEM, PENNSYLVANIA.

PAPER-BAG MACHINE.

SPECIFICATION forming part of Letters Patent No. 337,965, dated March 16, 1886.

Application filed February 24, 1885. Serial No. 156,866. (No model.)

*To all whom it may concern:*

Be it known that we, WILLIAM A. LORENZ and WILLIAM H. HONISS, both of Hartford, Connecticut, have invented certain new and useful Improvements in Paper-Bag Machines, of which the following description and claims constitute the specification, and which are illustrated by the accompanying five sheets of drawings.

Figure 5:
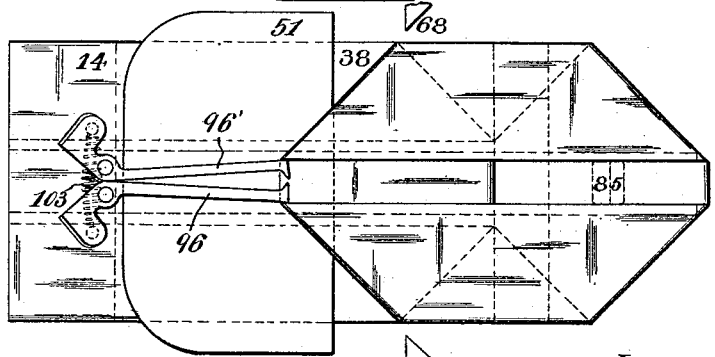

This machine manufactures continuous tucked paper tubing into paper-bag blanks, which have one end folded down into the diamond shape shown in Figure 5 of the drawings, and which may be manufactured into paper bags by means of machinery shown in our application of May 15, 1884, for Letters Patent of the United States. The diamond-folding mechanism of this machine differs materially from any other known to us.

Figure 1:
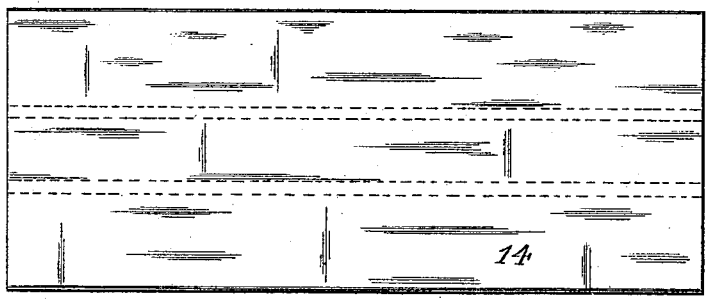
Figure 2:
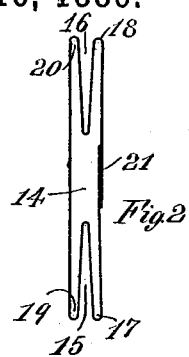
Figure 3:
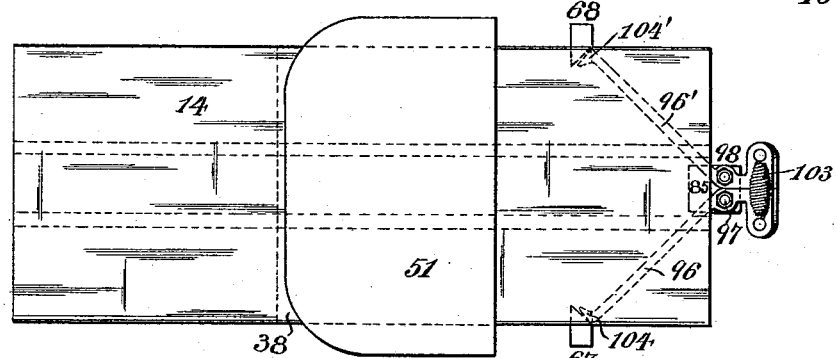
Figure 4:
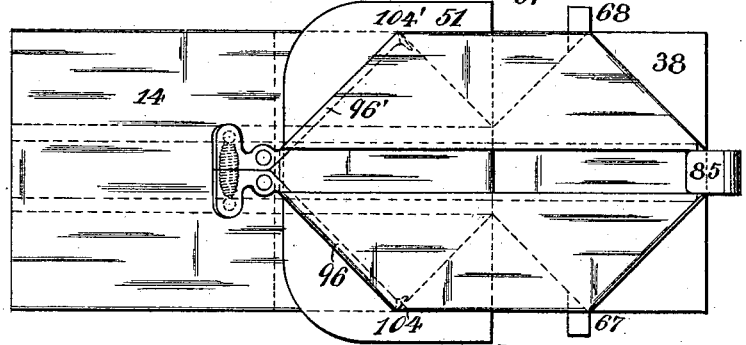
Figure 6:
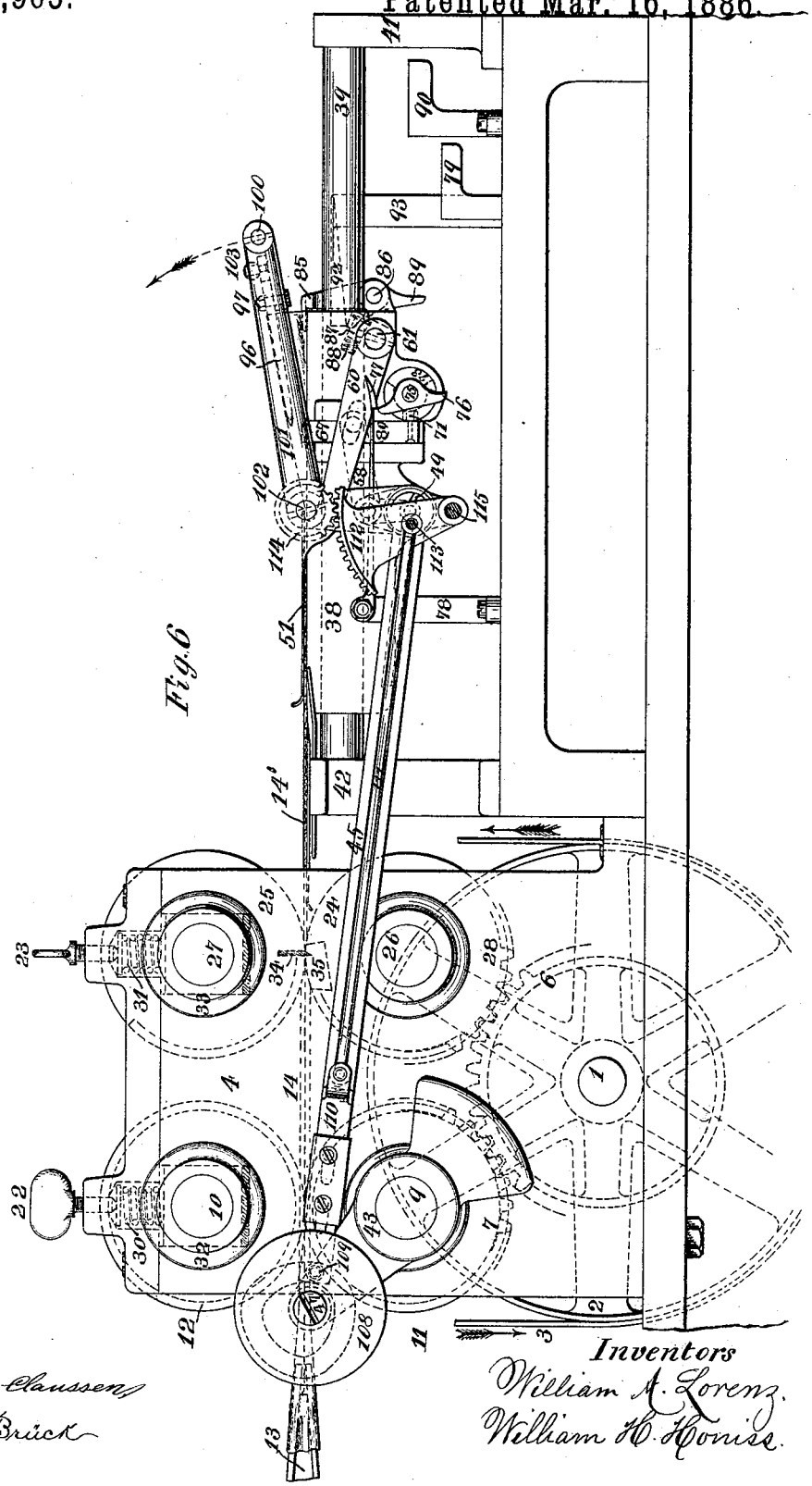
Figure 7:
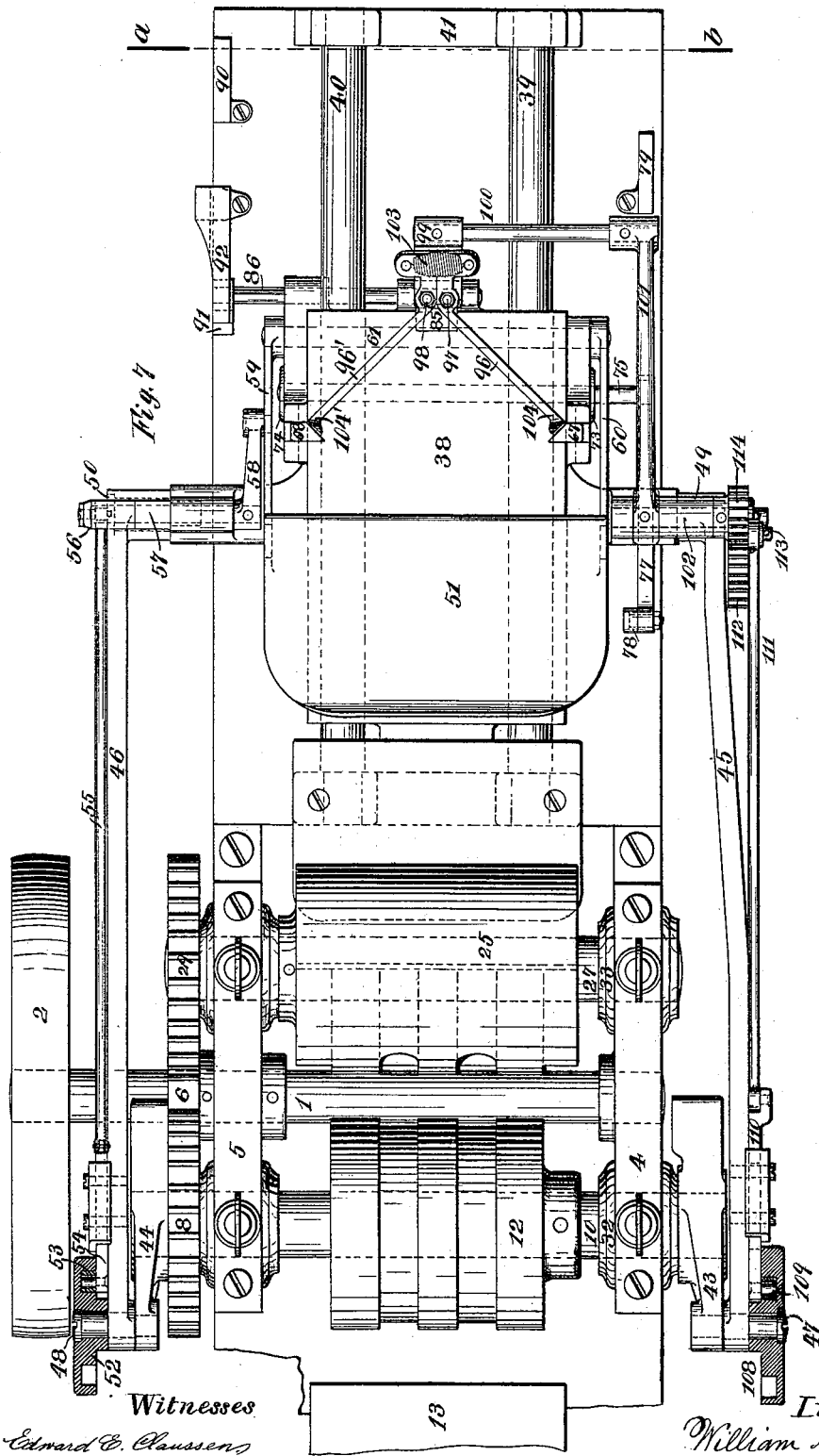
Figure 8:
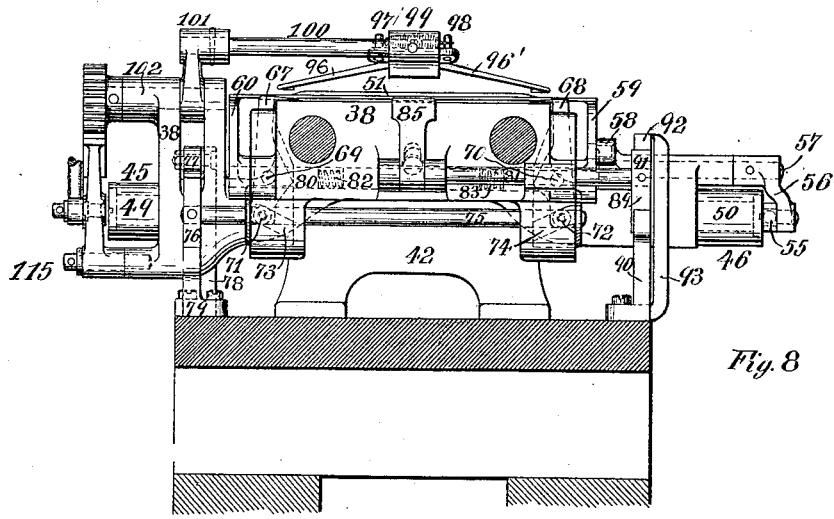
Figure 9:
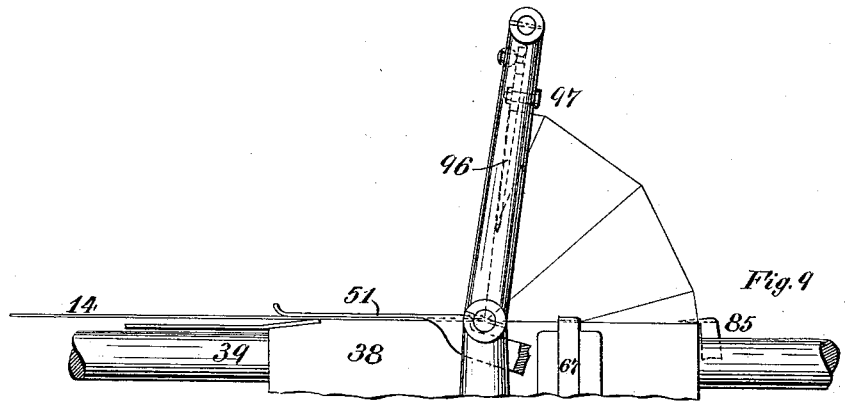
Figure 10:
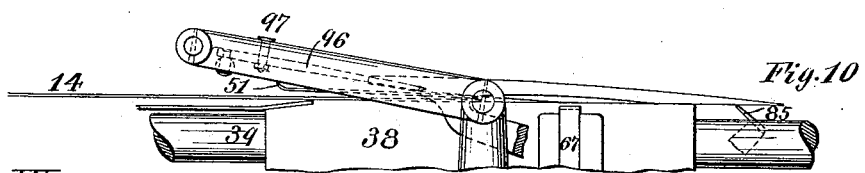

Fig. 1 of the drawings is a plan view of a section of tucked paper tubing of suitable length for a bag-blank, and Fig. 2 is an end view of the same. Fig. 3 is a plan view of the tube of Figs. 1 and 2, and of parts of the diamond-folding mechanism of this machine in position to operate upon that tube. Fig. 4 is a plan view of what is shown in Fig. 3 after the diamond-folding mechanism has done its work. Fig. 5 is a plan view of the folded blank of Fig. 4, being withdrawn from the diamond-folding mechanism. Fig. 6 is a side view of our new paper-bag machine. Fig. 7 is a plan view of the same. Fig. 8 is a sectional view of the machine, looking to the left from the line *a b* of Fig. 7. Fig. 9 is a side view of parts of the diamond-folding mechanism when partly turned over in doing its work. Fig. 10 is a side view of the same when fully turned over and in the position relatively to the blank shown in Fig. 5. Fig. 11 is a fragmentary plan view of parts of the mechanism shown in complete plan view in Fig. 7. Fig. 12 is an enlarged detached view of parts of the mechanism shown in Fig. 8. Fig. 13 is a view of the left-hand end of what is shown in plan view in Fig. 11 and in elevation in Fig. 12.

The shaft 1 is driven by the pulley 2 in the direction indicated by the arrows adjacent to the belt in Fig. 6, and it runs in the uprights 4 and 5 and carries the intermediate gear, 6. That gear meshes with the gear 7 on the shaft 9, and the gear 7 meshes with the gear 8 on the shaft 10. The shafts 9 and 10 carry the drawing-rolls 11 and 12, which rolls draw the tucked paper tube into the machine from an adjacent machine adapted to manufacture the same, and the extremity of the tube-former of which is indicated in Figs. 6 and 7 by the numeral 13. The tucked paper tube 14 has the tucks 15 and 16, the lower folds, 17 and 18, the upper folds, 19 and 20, and the seam 21. The cutting-rolls 24 and 25 are keyed to the shafts 26 and 27, respectively, and receive motion from the gear 6, which meshes with the gear 28 on the shaft 26, while the gear 28 meshes with the gear 29 on the shaft 27. The upper drawing-roll, 12, and the upper cutting-roll, 25, are subject to the downward pressure of the springs 30 and 31, respectively, which springs bear downward upon the sliding boxes 32 and 33, respectively, and are adjustable by the thumb-screws 22 and 23, respectively. Similar springs, boxes, and thumb-screws are also used on the other side of the machine to press downward upon the other ends of the upper drawing-roll and cutting-roll. The knife 34 is fixed in the periphery of the cutting-roll 25, and lengthwise thereof, while the rubber pad 35 is fixed correspondingly in the periphery of the cutting-roll 24.

The drawing-rolls have annular recesses on their peripheries, and the cutting-rolls have corresponding recesses extending part way around their peripheries, as shown in Fig. 7, the object of which recesses is to give room for the passage of the six turns in the tucked paper tubing without flattening them down, and thus depriving them of their elasticity.

A reciprocating carriage, 38, slides on ways 39 and 40, supported by brackets 41 and 42. The carriage is driven by the cranks 43 and 44, keyed to the shaft 9, which cranks work the connecting-rods 45 and 46 through the crank-pins 47 and 48, respectively, and which connecting-rods work the carriage through the carriage-pins 49 and 50, respectively. The presser-plate 51 is placed upon the rear part of the carriage 38, and is operated by the cam 52, which cam is keyed to the crank-pin 48, and through the cam-roller 53 works the slide 54 and the connecting-rod 55. That rod is pivoted to the arm 56, which arm is keyed to the shaft 57, and which shaft carries on its inner end the arm 58. That arm has a pivot projecting at right angles therewith from its inner side near its end, and that pivot works in a longitudinal slot in the arm 59. The latter and a corresponding arm, 60, are both keyed to the shaft 61, which oscillates in bearings in the carriage 38. The extremities of the arms 59 and 60 are fastened to the forward corners, respectively, of the presser-plate 51. The bevel-pointed side grippers, 67 and 68, are pivoted to the carriage 38 on pins 69 and 70, respectively, so as to vibrate crosswise of the carriage. Those grippers are caused to vibrate by the rollers 71 and 72, respectively, running in cam-grooves on the peripheries of the cylindrical cams 73 and 74, respectively, which cams are keyed to the shaft 75. A dog, 76, is also keyed to the shaft 75, and operates to oscillate the same whenever by the forward motion of the carriage 38 the upper end of the dog is brought into contact with and caught by the spring-hook 77, which spring-hook is attached at its other end to the bracket 78. The presser-bolts 80 and 81 are pressed against the inner sides of the grippers 67 and 68, respectively, by the springs 82 and 83, respectively, in such a way as to hold the grippers down upon the top of the carriage whenever the adjacent angular projections of the grippers, respectively, are below the centers of the pins 69 and 70, respectively. The abutment 79 is fixed in a proper position to collide with the lower end of the dog 76 as the latter moves forward with the carriage. The front gripper, 85, is keyed to the shaft 86, and is provided with an angular projection adjacent to the head of the front presser-bolt, 87, which bolt is pressed against the gripper by the spring 88. The dog 89 is also keyed to the shaft 86, and it operates to open the gripper 85 by colliding with the abutment 90 whenever by the forward movement of the carriage it is brought in contact therewith. The upper end, 91, of the dog 89 operates to close the gripper 85 down upon the carriage 38 whenever at the first part of the forward stroke of the carriage that upper end is caught by the spring-hook 92, which hook is supported by the bracket 93. The fingers 96 and 96' are pivoted at 97 and 98, respectively, to a swinging head, 99, which head is keyed to one end of the cross-arm 100. That cross-arm is keyed to the outer end of the swinging arm 101, and at right angles to the latter arm, which in turn is keyed to the shaft 102, and which shaft oscillates in bearings in upward projections of the carriage 38. A coiled spring, 103, connects the power ends of the fingers 96 and 96' with a tension just sufficient to hold them closely together and the working ends apart, except when the latter are forced together by the withdrawal of the completed paper-bag blank from the carriage. The extremities of the working ends of the fingers 96 and 96' are formed with right-angle corners 104 and 104', respectively, which corners, when the working ends of the fingers are most widely separated, as in Figs. 3 and 4, are the same distance apart as are the inner corners of the upper folds of the tucked paper tubing. The cam 108 on the crank-pin 47 drives the roller 109 on the slide 110, which slide is connected by the rod 111 to the sector-gear 112 at the pivot 113. That sector-gear oscillates upon the pivot 115, and meshes with the pinion 104, which pinion is keyed to the shaft 102.

The mode of operation is as follows: The tucked paper tubing is continuously drawn into this machine by the drawing-rolls 11 and 12, and is projected by the rolls 24 and 25 under the uplifted presser-plate 51, and thence still farther forward upon the carriage 38, till the fingers 96 and 96' enter the forward ends of the upper folds thereof, and the gripper 85 enters the forward end of the paper tubing at its longitudinal center and clasps it down upon the carriage 38, which at that moment has advanced through a portion of its forward stroke. Thereupon the knife 34 severs the bag-length 14', which is in advance of it, at the same time that the presser-plate 51 presses that length firmly down upon the carriage 38, and at the same time that the side grippers, 67 and 68, enter the respective adjacent tucks of the bag-length, and press their lower folds down upon the carriage at the places indicated in Fig. 7. Then the arm 101 oscillates from the position shown in Fig. 6 to that shown in Fig. 9, and thence, without stopping, to that shown in Fig. 10. That movement carries with it the cross-arm 100, the swinging head 99, and the fingers 96 and 96', and those fingers carry with them the upper ply of the forward end of the tucked-tube bag-length, and thus they turn it over upon itself against the forward edge of the presser-plate 51, while they also define the diagonal creases upon which the rear end of the diamond is folded down. The diagonal creases upon which the forward end of the diamond is folded down are defined by the lines of strain between the gripper 85 and the grippers 67 and 68, respectively, while the side creases of the diamond are defined by the lines of strain between the grippers 67 and 68, respectively, and the corners 104 and 104', respectively, of the fingers 96 and 96'. While the above-described folding of the diamond is being done, the carriage travels to the forward limit of its stroke, and at that point the gripper 85 is removed from the bag-blank, and is thrown into the position shown in Fig. 10 by means of the abutment 90 colliding with the lower arm, 89, of that gripper, while the grippers 67 and 68 are removed sidewise and away from the bag-blank by means of the abutment 79 colliding with the lower end of the dog 76, and thus forcing the shaft 75 and the cams 73 and 74 to oscillate, and thus to force toward each other the lower ends of the grippers, and while the presser-plate 51 is raised from the bag-blank by the action of the cam 52 through the roller 53, the slide 54, the rod 55, the arm 56, the shaft 57, the arm 58, and the arms 59 and 60. Thus released from the grippers and the presser-plate, the bag-blank may be withdrawn from the machine by any proper mechanism, which may also transfer it to other machinery for making the subsequent folds of the bottom of the bag. As the bag-blank is withdrawn, the diagonal folds of the rear end of the diamond force the working ends of the fingers 96 and 96' together against the resistance of the spring 103; but when the fingers are released from the diamond that spring returns the fingers to their relative working positions. As the carriage makes its return-stroke, the fingers 96 and 96' are swung back from the position shown in Fig. 10 to that shown in Fig. 6 by means of the cam 108 operating the roller 109, the slide 110, the rod 111, the sector-gear 112, the pinion 114, the shaft 102, the arm 101, the cross-arm 100, and the swinging head 99, which devices also caused the opposite swinging motion, heretofore described as operating to fold the diamond.

We do not herein claim the combination of the carriage 38, the gripper 67, the cam 73, the shaft 75, the dog 76, the hook-spring 77, and the abutment 79, because that combination is substantially covered by claim 2 of our application No. 156,865 for Letters Patent of the United States of America, executed on the same day and filed on the same day with this specification.

We claim as our invention—

1. The combination of the fingers 96 and 96' with the spring 103, all constructed and operating together substantially as described.

2. The combination of the reciprocating carriage 38, the presser-plate 51, the side grippers, 67 and 68, and the front gripper, 85, all operating together substantially as described.

3. The combination of the reciprocating carriage 38, the presser-plate 51, the gripper 85, and the fingers 96 and 96', substantially as described.

4. The combination of the reciprocating carriage 38, the fingers 96 and 96', the gripper 85, and the grippers 67 and 68, all operating together to open out the end of the tucked paper tube, substantially as described.

5. The combination of the reciprocating carriage 38, the presser-plate 51, the gripper 85, the grippers 67 and 68, and the fingers 96 and 96', all operating together to fold the forward end of the blank of Figs. 1 and 2 into the diamond shape of Fig. 5, all substantially as described.

WILLIAM A. LORENZ.
WILLIAM H. HONISS.

Witnesses:
ALBERT H. WALKER,
FRANK H. PIERPONT.